April 4, 1950  F. O. WISMAN  2,503,017
GENERATOR

Filed Aug. 10, 1946  2 Sheets-Sheet 1

INVENTOR
FRANKLIN O. WISMAN
By Cecil J Arens
ATTORNEY.

April 4, 1950     F. O. WISMAN     2,503,017
GENERATOR

Filed Aug. 10, 1946     2 Sheets-Sheet 2

INVENTOR
FRANKLIN O. WISMAN
BY Cecil F Arens
ATTORNEY

Patented Apr. 4, 1950

2,503,017

UNITED STATES PATENT OFFICE 2,503,017

GENERATOR

Franklin O. Wisman, South Bend, Ind., assignor to Bendix Aviation Corporation, South Bend, Ind., a corporation of Delaware Application August 10, 1946, Serial No. 689,652

2 Claims. (Cl. 171—252)

This invention relates to electrical machinery and more particularly to a machine for generating alternating current.

The device of the invention is primarily for use on velocipedes, power operated bicycles, and motorcycles or the like, to supply energy to the lighting systems thereof. Many velocipedes, as well as power propelled machines, use batteries, while others use electrical generators directly connected to the lighting systems of these machines to supply the electrical energy therefor. Batteries provide a continuous supply of energy regardless of the speed of the machine, yet they are objectionable, since they require constant vigilance. Most lighting systems of the aforementioned variety having a generator directly connected to the system are objectionable from the standpoint of current fluctuations in the system between minimum and maximum speed of the driving machine. That is, on a power propelled bicycle, for example, at idle speed the intensity of the lights will be only a glow and will not reach full intensity until near maximum speed of the engine is reached. This is due to a great extent to poor output regulation of the generator.

It is therefore an important object of the invention to provide a generator having optimum output regulation within a predetermined range.

A further object of the invention resides in the provision of a generator the output energy of which may be regulated by varying the reluctance of the rotor poles leakage path.

A still more important object of the invention resides in the provision of an electrical generator having a permanent magnet rotor which is shunted in accordance with its rotative speed to thereby regulate the output voltage of the generator.

A yet further object of the invention resides in the provision of an electrical generator having a permanent magnet rotor the leakage flux of which is caused to vary in accordance with the current in the stator winding to thereby regulate the output voltage of the generator.

Another important object lies in the provision of an electrical generator having a rotor the working flux of which is shunted by centrifugally positioned members which depend upon generator speed, to control the regulation of generator output potential.

An important object of the invention is to provide a generator of this character, which is simple, compact, and closely organized in construction, easy and comparatively inexpensive to manufacture and reliable in operation.

The above and other objects and features of the invention will be apparent from the following description of the apparatus taken in connection with the accompanying drawings which form a part of this specification, and in which.

Figure 1:
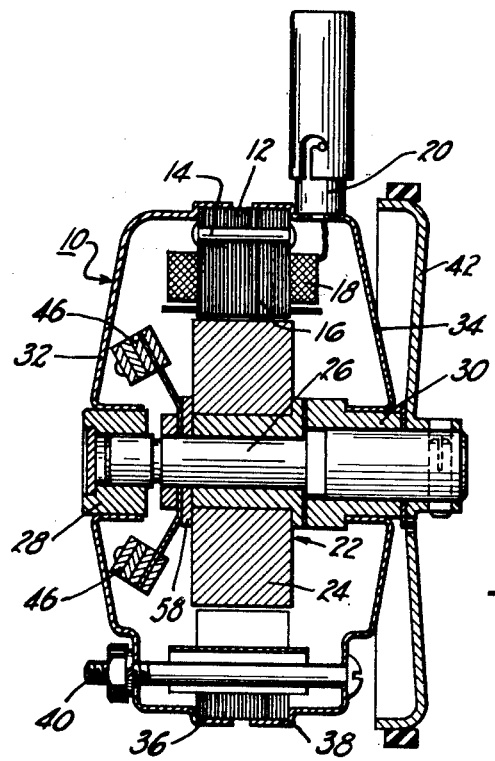
Figure 1 is a longitudinal section of the generator of the invention with parts in elevation.
Figure 2:
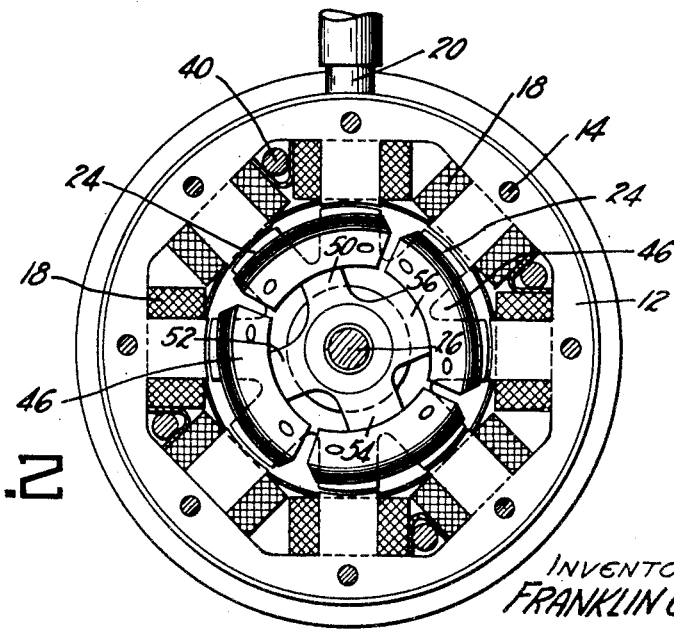
Figure 2 is a transverse section of the device of Figure 1 showing an end view of the rotor and regulator assembly.

Referring now to Figure 1 of the drawings reference numeral 10 designates a generator having a laminated stator 12 held in assembled relationship by rivets 14 to form pole pieces 16 which carry coils 18. The coils are disposed within the stator and connected in a manner familiar to those skilled in the art. The present embodiment discloses an eight pole generator but it is to be understood that more or fewer poles may be used depending upon the requirements to be met. The output of the generator is fed into a plug 20 into which wires supplying a light system, not shown, may be connected.

An armature or rotor 22 is disposed to rotate within the stator 12 and comprises eight poles or permanent magnets 24. A shaft 26 is securely fastened to the rotor in any suitable manner to rotate therewith and is carried by bearings 28 and 30. These bearings are respectively located in end sections 32 and 34 formed at 36 and 38 to fit over the stator 12 to provide a housing for the rotor 22. Bolts 40 hold the sections 32 and 34 and stator 12 in assembled relationship. A driving disc 42 is keyed to the shaft to be rotated by means, not shown.

The novel feature of a generator resides in the provision of spring mounted centrifugally positioned shunts comprising laminated weights 46 secured to stepped cantilever springs 50, 52, 54 and 56. There is a weight for each pair of permanent magnets 24. These springs terminate in a common base 58 which is held in fixed relationship to the rotor in any suitable means. It will be noted that spring 50 is of less width than spring 52, spring 52 is of less width than spring 54 and so on. This arrangement provides different spring characteristics to permit preselection of the rotor speeds at which centrifugal force due to weights 46 will overcome the springs. Instead of using springs of different widths the mass of the weights may be varied by adding or removing laminations as desired. This would accomplish the same thing as stepped springs. As these weights are moved toward the pole pieces or permanent magnets 24 the working flux which normally passes from the rotor 22 across the air gap to the stator is reduced since a second magnetic circuit through the weights, parallel to the magnetic circuit through the stator, is provided. Since the M. M. F. produced in the stator due to flow of load current opposes the flux from the rotor the rotor leakage flux tends to increase as the stator current increases. This increase in flux leakage in the rotor further moves the weights toward the rotor pole pieces to thereby decrease the reluctance of the magnetic circuit and reduce the working flux entering the stator. There are two forces acting on the weights 46 tending to move them toward the permanent magnets 24, namely, centrifugal action and magnetic attraction. It should be pointed out that the springs 50, 52, 54 and 56 may be the same width or any combination of widths depending upon the desired regulation of the generator.

Figure 4:
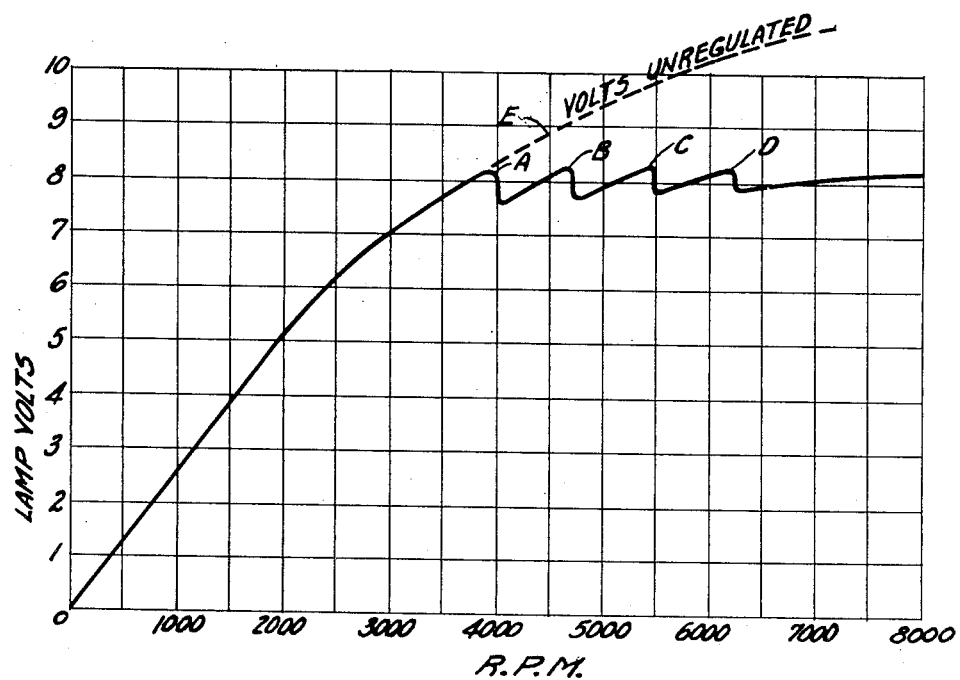
Figure 4 is a curve.

Figure 4 shows a voltage regulation curve of the generator of Figure 1 utilizing stepped regulation. The voltage regulation curve is based on fixed connected lamp load, that is, constant load. As shown on the regulation curve the generator voltage may be held within a range of 6 to 8 volts for a generator range from 2500 to 8000 R. P. M. with a predetermined load. The output voltage fluctuates about one-half volt with a generator range from 3500 to 8000 R. P. M. The curve is saw toothed in theory but in actual practice it is much smoother due to design and unavoidable irregularities of the detail parts of the regulator assembly or spring mounted shunts. Tooth A on the curve represents the voltage regulation when spring 50 is deflected to permit the weight attached to the spring to shunt a pair of the permanent magnets 24. Teeth B, C and D of the curve represents the output regulation when the weights carried by springs 52, 54 and 56 are caused to shunt the remaining pairs of permanent magnets 24 of the rotor. With all of the weights in a shunting position the curve shows only a slight increase in voltage beyond a generator speed of 6500 R. P. M., behaving substantially as a constant current device. The unregulated voltage curve is shown at E.

Figure 3:
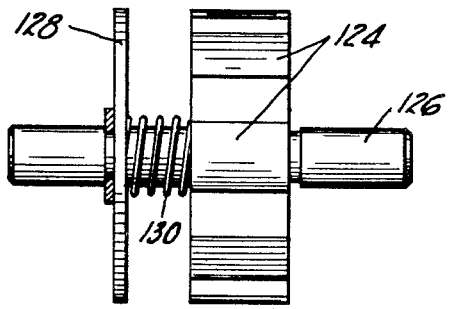
Figure 3 is a longitudinal view in elevation of a modified form of rotor and regulator assembly.

Figure 3 shows an alternative form of rotor having permanent magnets 124 and a shaft 126. A disc 128 is carried by the shaft and is slidable axially thereon. A spring 130 encircles the shaft 126 and normally biases the disc away from the magnets 124. As the M. M. F. in the stator increases, its opposition to the working flux from the rotor increases, to thereby increase the rotor leakage flux. The increase in rotor leakage flux attracts the disc 128 toward the magnets 124 to provide a parallel path or circuit for the working flux. As the disc moves closer to the magnets the working flux to the stator decreases to thereby obtain the desired output regulation.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A dynamoelectric machine comprising a stator with current carrying coils arranged thereon, a rotor constructed and arranged to supply working flux which emanates in the rotor and traverses the stator in a manner to cause the flux to link with said coils to thereby produce a voltage which increases with rotor speed within a predetermined speed range, and shunts carried by said rotor and normally urged away therefrom, said shunts movable toward said rotor in succession in response to different rotor speeds beyond a predetermined rotor speed to thereby reduce the working flux in steps to the stator, whereby output regulation above said predetermined speed is obtained.

2. A dynamoelectric machine comprising a stator with current carrying coils arranged thereon, a rotor constructed and arranged to supply working flux which emanates in the rotor and traverses the stator in a manner to cause the flux to link with said coils to thereby produce a voltage which increases with rotor speed within a predetermined speed range, a weight for each pair of rotor poles, said weight together with the rotor constructed and arranged to provide a parallel magnetic circuit for the working flux at times when the rotor speed is within said predetermined range, and a cantilever spring for each weight secured to the rotor and normally urging its associated weight away from the rotor, each spring constructed and arranged to flex in response to different rotor speeds within the predetermined speed range to thereby reduce the working flux in increments by providing a plurality of parallel magnetic circuits, whereby smooth output regulation is obtained.

FRANKLIN O. WISMAN.

REFERENCES CITED

The following references are of record in the file of this patent:

UNITED STATES PATENTS

| Number | Name | Date |
|---|---|---|
| 615,351 | Fuller | Dec. 6, 1898 |

FOREIGN PATENTS

| Number | Country | Date |
|---|---|---|
| 415,956 | Germany | July 7, 1925 |